(12) United States Patent
Singh et al.

(10) Patent No.: US 11,477,288 B1
(45) Date of Patent: Oct. 18, 2022

(54) HIGH AVAILABILITY FOR STREAMING TELEMETRY

(71) Applicant: Juniper Networks, Inc., Sunnyvale, CA (US)

(72) Inventors: Maneet Singh, Bangalore (IN); Kishore Wariyal, Roorkee (IN); Vivek M, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/305,122

(22) Filed: Jun. 30, 2021

(30) Foreign Application Priority Data

May 18, 2021 (IN) .............................. 202141022226

(51) Int. Cl.
*H04L 67/14* (2022.01)
*H04L 67/12* (2022.01)
*H04L 67/1095* (2022.01)

(52) U.S. Cl.
CPC .......... *H04L 67/14* (2013.01); *H04L 67/1095* (2013.01); *H04L 67/12* (2013.01)

(58) Field of Classification Search
None
See application file for complete search history.

(56) References Cited

U.S. PATENT DOCUMENTS

| 8,050,559 | B2 | 11/2011 | Sindhu | |
| 10,491,329 | B1* | 11/2019 | Davis | .................... H04L 69/161 |
| 2005/0076099 | A1* | 4/2005 | Wang | ...................... H04L 67/56 |
| | | | | 709/219 |
| 2018/0097720 | A1* | 4/2018 | Jaffer | ...................... H04L 45/22 |
| 2019/0339687 | A1* | 11/2019 | Cella | ................ G05B 19/41865 |
| 2019/0339688 | A1* | 11/2019 | Cella | ................... G05B 23/0229 |
| 2020/0334125 | A1* | 10/2020 | Degaon | ............... H04L 43/0817 |
| 2020/0348662 | A1* | 11/2020 | Cella | ................... H04W 52/246 |

OTHER PUBLICATIONS

Gupta et al., "Sonata: Query-Driven Network Telemetry", May 2, 2017, Cornell University Library, arxiv.org pp. 2-8 (Year: 2017).*

(Continued)

*Primary Examiner* — Davoud A Zand
(74) *Attorney, Agent, or Firm* — Shumaker & Sieffert, P.A.

(57) ABSTRACT

An example network device includes a primary node and a secondary node. The primary node includes one or more processors implemented in circuitry and configured to receive a message from a collector device requesting to subscribe to statistics of a metrics streaming session; initiate a telemetry session for sending the statistics to the collector device; replicate data of the telemetry session to the secondary node; and send the data of the telemetry session to the collector device. In this manner, in the event of the switchover, the secondary node may act as the primary node and resume the telemetry session. That is, the secondary node, acting as a primary node following the switchover, may receive statistics data from one or more sensors related to the metrics streaming session, and send telemetry session data, representative of the statistics data, to the collector device as part of the telemetry session.

14 Claims, 6 Drawing Sheets

(56) References Cited

OTHER PUBLICATIONS

U.S. Appl. No. 15/806,625, entitled, "Socket Replication Between Nodes of a Network Device Without Operating System Kernel Modification," filed Nov. 8, 2017.

Shaikh, "OpenConfig—progress toward vendor-neutral network management," Google network operations and OpenConfig group, Google Cloud, Oct. 4, 2017, 14 pp.

Leiva, "Programming Network Devices with gRPC and OpenConfig," ons Europe, Open Networking, Sep. 2018, 33 pp.

"Junos Telemetry Interface User Guide," Junos OS, Juniper Networks, Apr. 18, 2021, 681 pp.

"Overview of the Junos Telemetry Interface," TechLibrary, Juniper Networks, Mar. 4, 2019, 4 pp.

Borman et al., "gRPC Network Management Interface (gNMI)," gnmi-specification.md, Version 0.6.0, Jan. 30, 2018, 39 pp.

\* cited by examiner

HIGH AVAILABILITY FOR STREAMING TELEMETRY

This application is a utility with foreign priority of Indian Provisional Patent Application No. 202141022226, filed May 18, 2021, the entire contents of which is incorporated herein by reference.

TECHNICAL FIELD

This disclosure relates to computer networks and, more particularly, to network devices, such as routers, that perform a switchover from a primary control unit to a secondary control unit.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop in the network. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" by which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing communication session detects a failure of the session. i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, for example, the secondary routing control unit assumes the responsibility of forwarding packet flows. During a switchover from the primary routing control unit to the secondary routing control unit, a significant period of time may elapse before the secondary routing control unit reaches a state in which it is able to process and forward packets. For example, the secondary routing control unit may need to reestablish routing communication sessions, e.g., BGP sessions, that were lost when the primary routing control unit failed. During this period, network traffic may be queued or lost.

To prevent loss of data, primary and backup routing control units can perform socket data replication. Such socket data replication is an important requirement for high-availability of L4 (Transport Layer) connections to handle failovers from the primary to the backup. Although socket data replication has typically been performed in user/kernel space, such an implementation not only involves the overhead of system calls, but also the additional overhead of copying data from kernel-to user-space to replicate the socket data.

Such memory copy operations are computationally expensive. Conventional socket data replication techniques rely on modification to the kernel socket layer of an operating system, as well as user space applications, to accommodate data replication functionality. This is because the application needs to be configured to handle its socket as a replicated socket, and the socket layer has to intercept data flowing in either direction to make sure data is being replicated before it is sent to the destination (application) or down the stack for transmission. In order to make this possible, there needs to be heavy modifications in the kernel socket layer as well as the protocol and the application layer.

SUMMARY

In general, this disclosure describes techniques for enabling graceful switchover for telemetry sessions. Telemetry sessions may be used to stream statistics of various elements of a network device, such as a line card, a packet processor such as a packet forwarding engine, or a routing engine. Such statistics may be sent to a collector device, which may collect the statistics for use by an administrator to make configuration changes to devices of the network. In general, a network device, such as a router, may send the statistics as part of a telemetry session to the collector device.

In accordance with the techniques of this disclosure, a network device including two or more nodes for high availability may be configured to include a telemetry session as part of a switchover procedure. That is, a primary node of the network device may be configured to replicate telemetry session data to a secondary node configured as a backup node for the primary node. In the event of a switchover from the primary node to the secondary node, the secondary node may begin acting as the primary node for the telemetry session.

In one example, a method includes receiving, by a primary node of a routing device, a message from a collector device requesting to initiate a telemetry session to subscribe to statistics of a metrics streaming session; initiating, by the primary node, the telemetry session for sending the statistics to the collector device; replicating, by the primary node, data of the telemetry session to a secondary node of the routing device, the secondary node being configured as a backup node to the primary node in the event of a switchover from the primary node to the secondary node; and sending, by the primary node, the data of the telemetry session to the collector device.

In another example, a network device includes a primary node implemented in circuitry; and a secondary node implemented in circuitry, the secondary node being configured as a backup node to the primary node in the event of a switchover from the primary node to the secondary node; wherein the primary node is configured to: receive a message from a collector device requesting to initiate a telemetry session to subscribe to statistics of a metrics streaming session; initiate the telemetry session for sending the statistics to the collector device; replicate data of the telemetry session to the secondary node; and send the data of the telemetry session to the collector device.

In another example, a computer-readable storage medium has stored thereon instructions that, when executed, cause a processor of a primary node of a network device to receive a message from a collector device requesting to initiate a telemetry session to subscribe to statistics of a metrics streaming session; initiate the telemetry session for sending the statistics to the collector device; replicate data of the telemetry session to a secondary node of the routing device, the secondary node being configured as a backup node to the primary node in the event of a switchover from the primary node to the secondary node, and send the data of the telemetry session to the collector device.

The details of one or more examples are set forth in the accompanying drawings and the description below. Other features, objects, and advantages will be apparent from the description and drawings, and from the claims.

DETAILED DESCRIPTION

Figure 1:
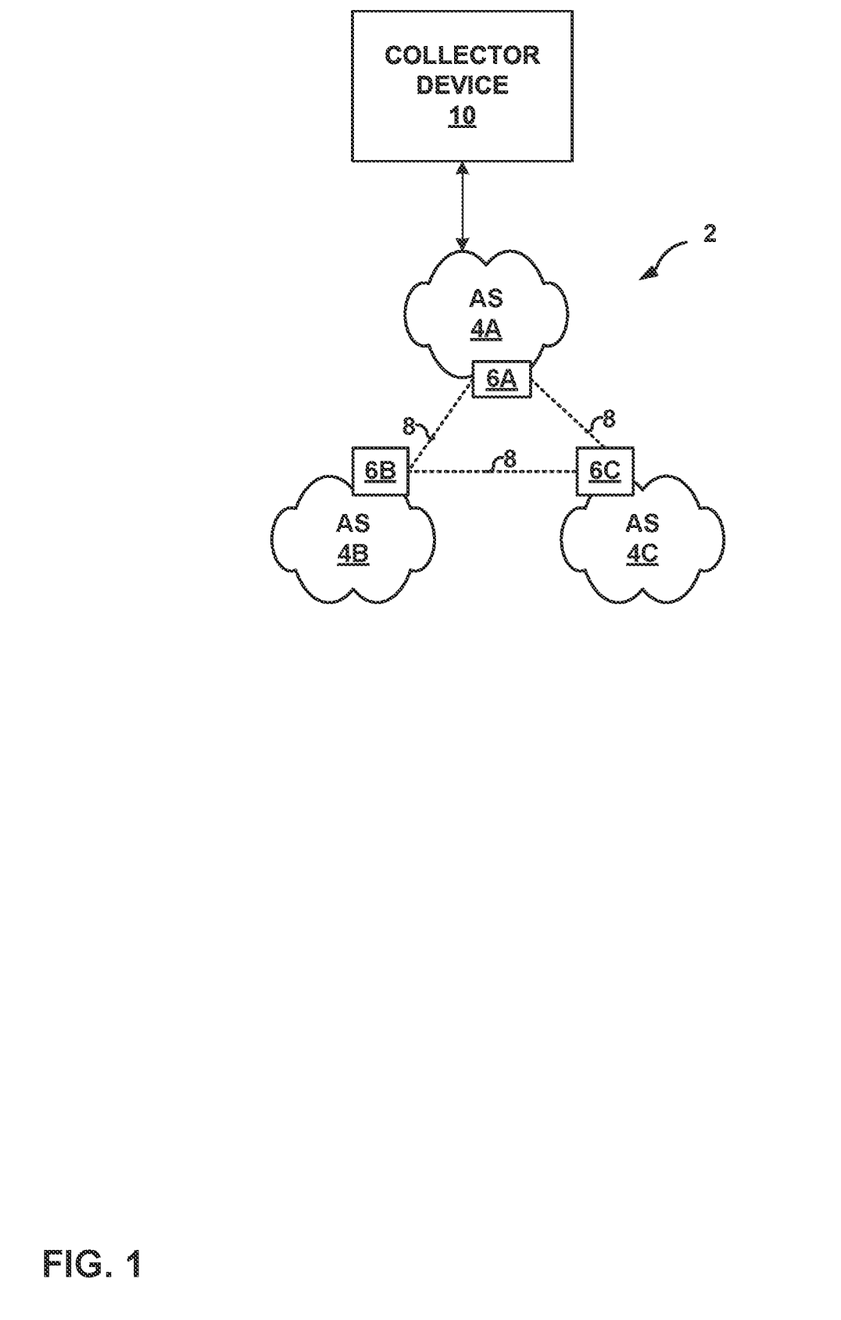
FIG. 1 illustrates an example computing network formed by autonomous systems interconnected by communication links.

FIG. 1 illustrates an example computing network 2 formed by autonomous systems 4A-4C (herein autonomous systems 4) interconnected by communication links 8. Each of autonomous systems 4 represents an independent administrative domain having a variety of networked resources capable of packet-based communication. For example, autonomous systems 4 may include internal networks having servers, workstations, network printers and faxes, gateways, routers, and the like. In this example, autonomous systems 4 include autonomous system border routers (ASBRs) 6 for sharing routing information and forwarding packets via communication links 8. That is, routers 6 maintain peer routing sessions and exchange messages conveying routing information in accordance with a routing protocol, such as the Border Gateway Protocol (BGP). The messages communicated over the routing sessions typically advertise and withdraw routes for reaching destinations within network 2. In the event of a network topology change, such as link failure or failure of one of routers 6, any of the routers detecting the change issue routing messages informing the other routers of the affected routes. In response, routers 6 select new routes for reaching the destinations within network 2.

In order to mitigate the effects on node failure, one or more of routers 6 incorporate a primary routing node and one or more backup routing nodes to assume routing responsibilities in the event the primary routing node fails. Moreover, as described herein, one or more of routers 6 provide graceful switchover from the primary routing node to one of the secondary routing nodes using replication of routing communication sessions, such as sockets. That is, data for the sockets associated with the routing communication sessions on the primary routing node is transparently replicated to the secondary routing node in real-time (i.e., while the primary routing node exchanges routing messages) prior to any switchover event. The secondary routing node constructs and maintains communication sockets so as to mimic the sockets currently used by the primary routing node when communicating with the other routers 6.

During a switchover from the primary routing node to the secondary routing node, the pre-established sockets on the secondary routing node contain all the information needed to ensure that the connections with the routing peers stay up and need not be reestablished. This information typically includes any communication data queued in the socket buffer. As described herein, these techniques may be implemented without requiring changes to networking protocols. In this manner, the techniques provide for peer-agnostic socket replication.

For purposes of example, the techniques of this disclosure are described with reference to router 6A. However, any or all of routers 6B-6C may operate in accordance with the techniques described herein. In this example, router 6A provides non-stop routing by including a primary routing node as well as one or more standby routing nodes (not shown). In the event of a switchover, i.e., when the primary routing node of router 6A fails or otherwise needs to be shut down, one of the standby routing nodes assumes control over routing resources and routing functionality generally. Prior to the switchover, the primary and standby routing nodes synchronize their respective state information to allow the standby routing node to assume control of the router resources without having to relearn state information. Moreover, a corresponding socket is pre-established on the standby routing node for each socket currently in use by the primary routing node for routing sessions.

For example, router 6A may engage in a routing session with, e.g., router 6B using a socket. Router 6A and router 6B may exchange routing messages over the socket in accordance with a routing protocol, such as BGP. When router 6A receives a routing message from router 6B, the routing message may be internally forwarded to the primary routing node of router 6A for processing. Before being fully processed by the primary routing node and acknowledged, however, the received routing message is replicated and sent to the secondary routing node of router 6A. Similarly, when router 6A outputs routing messages to router 6B via the socket, the routing message to be sent is replicated and sent to the secondary routing node.

In response to receiving inbound or outbound routing messages, the secondary routing node updates state information for its socket corresponding to the socket of the primary routing node used for the communication session. In particular, the primary routing node of router 6A may send replicated data to the secondary routing node before the data is processed by a transport layer for the socket on the primary routing node. For example, data may be replicated and communicated to the secondary routing node before outbound data is packaged into a packet (when sending data) by the transport layer or before an inbound packet is unpacked from a packet (when receiving data) by the transport layer. As further illustrated below, this asymmetric replication of data for routing messages at different levels of the networking stack aids router 6A in ensuring that the state of the corresponding socket on the secondary routing node matches that of the socket of the primary routing node.

In the event that the primary routing node of router 6A goes down, for example as a result of a failure or because software of the primary routing node is to be updated, the secondary routing node detects the event (e.g., by way of heartbeat signal or explicit message from the primary) and assumes control of all routing functions. Because the secondary routing node has received all data that the primary routing node has sent and received, the secondary routing node may be able to continue the communication session without the necessity of a session restart. This data includes socket data replication (e.g., replication of inbound and outbound data) between different routing nodes.

For example, the secondary routing node may keep track of sequence numbers of received packets and received acknowledgements for the corresponding socket. The secondary routing node may also buffer sent data such that, if the primary routing node fails at a time when sent data is not received by a peer recipient (as determined by whether the secondary routing node has received an acknowledgement), the secondary routing node may retransmit the data after taking control of routing duties.

Additional details regarding socket replication are described in, e.g., "SOCKET REPLICATION BETWEEN NODES OF A NETWORK DEVICE WITHOUT OPERATING SYSTEM KERNEL MODIFICATION," U.S. patent application Ser. No. 15/806,625, filed Nov. 8, 2017, the entire contents of which are hereby incorporated by reference.

In addition, network 2 further includes collector device 10. Collector device 10 may subscribe to a telemetry session with router 6A. In addition to replicating sockets unrelated to a telemetry session, the primary routing node of router 6A may also replicate the telemetry session data, to ensure high availability for the telemetry session. In this manner, if a switchover (e.g., failover) occurs from the primary routing node to the secondary routing node, the secondary routing node can continue to provide data of the telemetry session to collector device 10 without stopping the telemetry session.

In general, the telemetry session may be based on a remote procedure call (RPC) protocol, such as a gRPC streaming session, a NETCONF streaming session, a Representational State Transfer (REST) session, or an OpenFlow session, or other such universal RPC framework. In some examples, the telemetry session may include a transmission control protocol (TCP) session and multiple hypertext transfer protocol 2 (HTTP/2) sessions over the TCP session. The HTTP/2 sessions may be multiplexed on the same TCP session. Accordingly, the techniques of this disclosure may be performed in conjunction with any streaming RPC telemetry session, which may be based on HTTP/2 or other such protocols.

Collector device 10 may send a request message to subscribe to statistics of a metrics streaming session associated with the telemetry session. Router 6A may receive the message and initiate the telemetry session with collector device 10. In particular, the subscription message may indicate which statistics are to be sent to collector device 10, such as data for certain network elements. e.g., label switched paths (LSPs), line cards, packet processors, routing engines, forwarding engines, firewalls, or the like, where the data may include packet counts, byte counts, routes, next hops, filter counts, or other such metrics. The various network elements may also be referred to as sources of metric data.

To initialize the telemetry session, router 6A may instantiate sensors one or more sensors in the various network elements (i.e., sources) from which data is to be collected. The sensors may monitor the corresponding network element to collect the requested metric data and send the metric data to the primary routing node (e.g., a telemetry unit of the primary routing node). The primary routing node may periodically transmit the metric data to collector device 10, e.g., via one or more respective HTTP/2 sessions over a TCP session for the telemetry session. For example, the primary routing node may deliver the metric data via respective HTTP POST commands.

In addition, according to the techniques of this disclosure, the primary routing node may also replicate the request message to the secondary routing node. Thus, the secondary routing node may create a telemetry session as well. Similarly, the secondary routing node may also instantiate sensors in the various network elements. Some of the network elements may be the same as those used by the primary routing node, whereas others may be different. For example, the primary routing node and the secondary routing node may include distinct routing engines in which the sensors may be instantiated, whereas line cards may be in common between the primary routing node and the secondary routing node. As another example, forwarding engines (or forwarding processes) may be in common between the primary routing node and the secondary routing node, or the primary routing node and the secondary routing node may include distinct respective forwarding engines. The line cards may include, for example, network interface cards (NICs), firewalls, intrusion detection and prevention (IDP) devices, tunnel physical interface cards (PICs), or the like.

In this manner, in the event of a failover or switchover from the primary routing node to the secondary routing node, the secondary routing node may assume responsibility as the primary routing node. Thus, the secondary routing node, acting as the primary routing node, may resume routing operations (e.g., by delivering data in one or more respective sockets), as well as resuming the telemetry session without interruption or needing to restart the telemetry session. In this manner, the techniques of this disclosure may provide high availability for a telemetry session. These techniques may thereby reduce downtime associated with switchover between routing nodes related to telemetry sessions, reduce duplicative network traffic associated with restarting a telemetry session, and thereby reduce network traffic and reduce processing operations performed by routers 6 and collector device 10.

Figure 2:
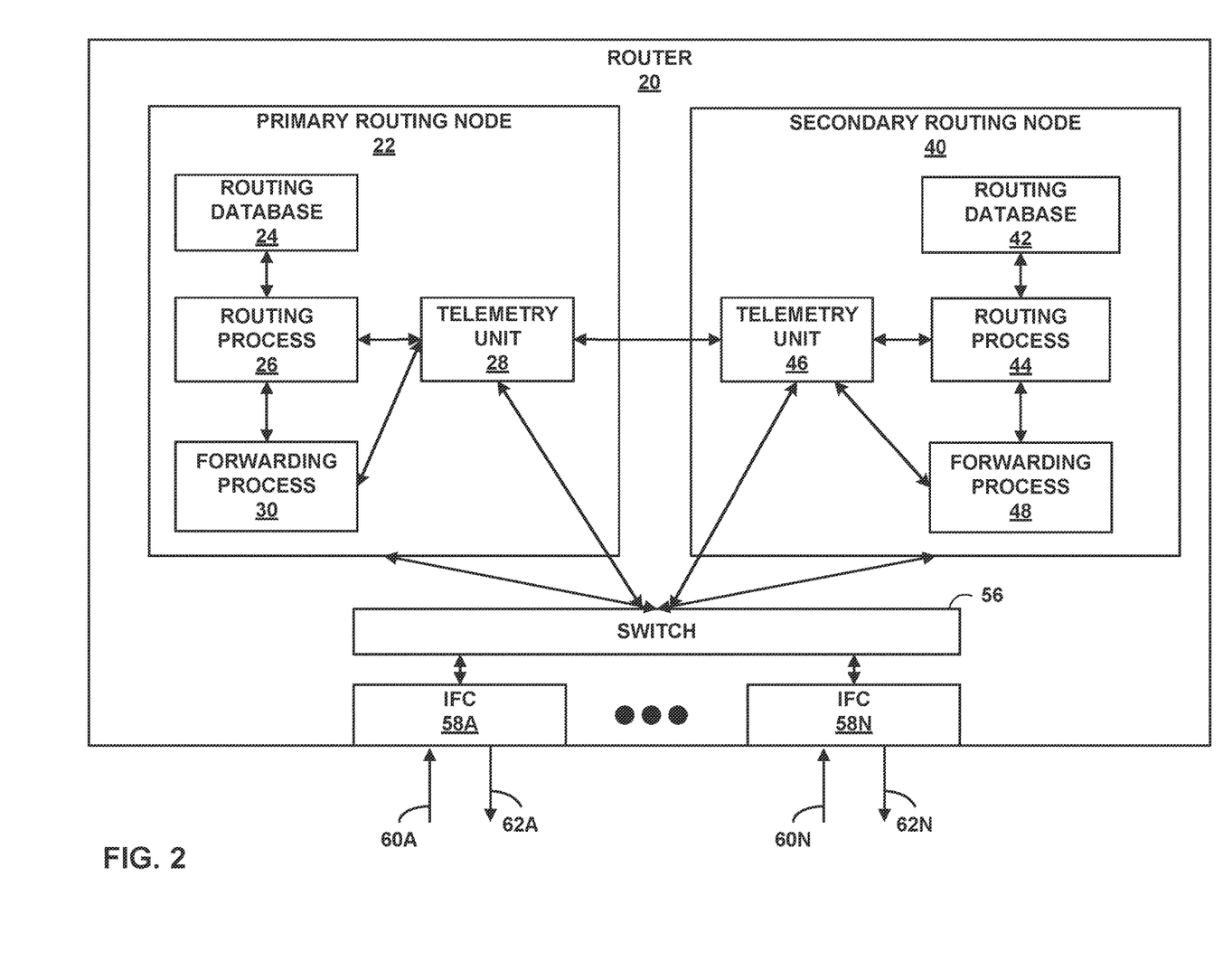
FIG. 2 is a block diagram illustrating an example router capable of performing a graceful switchover from a primary routing engine to a secondary routing engine using the techniques of this disclosure.

FIG. 2 is a block diagram illustrating an example router 20 capable of performing a graceful switchover from primary routing node 22 to a secondary routing node 40 using the techniques described herein. Router 20 may, for example, correspond to router 6A of FIG. 1.

In the example of FIG. 2, router 20 includes primary routing node 22 and secondary routing node 40. In this manner, router 20 may be viewed as having a primary control unit and a backup control unit. Primary routing node 22 is responsible for maintaining routing database 24 to reflect the current topology of a network and other network entities to which router 20 is connected. That is, primary routing node 22 provides an operating environment for execution of a routing process (daemon) 26 that implements one or more routing protocols to communicate with peer routers and periodically update routing database 24 to accurately reflect the topology of the network and the other network entities. Example protocols include routing and label switching protocols, such as BGP, mpBGP, IS-IS, OSPF, RIP, RSVP-TE and LDP. In a similar fashion, secondary routing node 40 provides an operating environment for maintaining routing database 42 in accordance with data received from primary routing node 22.

In a typical architecture, router 20 includes interface cards (IFCs) 58A-58N ("IFCs 58") that receive packets on inbound links 60A-60N ("inbound links 60") and sends packets on outbound links 62A-62N ("outbound links 62"). IFCs 58 are coupled to primary routing node 22 and secondary routing node 40 by high-speed switch 56. In another example, router 20 may be a multi-chassis router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs. U.S. Pat. No. 8,050,559, issued Nov. 1, 2011, entitled "MULTI-CHASSIS ROUTER WITH MULTIPLEXED OPTICAL INTERCONNECTS," which is incorporated herein by reference in its entirety, describes a multi-chassis router in which a multi-stage switch fabric, such as a 3-stage Clos switch fabric, is used as a high-end forwarding plane to relay packets between multiple routing nodes of the multi-chassis router.

One or more routing protocols implemented by routing process 26 establish peer routing sessions with other routers and, by way of these network communication sessions, exchange routing messages. As such, an operating system (OS) executing within primary routing node 22 implements kernel-level processes for handling data at various layers of the open systems interconnection (OSI) networking model (e.g., a protocol stack). The OS provides an API by which routing process 26 creates sockets and establishes, for example, TCP/IP-based communication sessions for sending and receiving routing messages for each socket. Sockets are logical constructs having data structures and state data maintained by the OS of primary routing node 22 and may be viewed as acting as interfaces between routing process 26 and a protocol stack.

Primary routing node 22 of router 20 also includes telemetry unit 28, which may be implemented in hardware, software, or firmware. When implemented in software or firmware, instructions of the software or firmware may be executed by one or more processors implemented in circuitry. Thus, telemetry unit 28 may be said to be implemented in circuitry. Telemetry unit 28 may receive a subscription from collector device 10 (FIG. 1) to statistics of a metrics streaming session associated with various elements of router 20, e.g., routing process 26, forwarding process 30, switch 56, IFCs 58, or other line cards not shown in FIG. 2 (e.g., a firewall. IDP, tunnel PIC, or the like). Telemetry unit 28 may instantiate sensors in any of these various elements of router 20 to collect such statistics, and deliver the statistics to collector device 10 (via switch 56 and one of respective IFCs 58).

Secondary routing node 40 provides an operating environment for execution of routing process 44. Like routing process 26, routing process 44 implements one or more routing protocols and periodically updates routing database 42 to accurately reflect the topology of the network and the other network entities. That is, like routing process 26, routing process 44 sends and receives routing messages through replicated sockets, where each of the replicated sockets corresponds to one of the sockets of primary routing node 22 currently in use for routing communications. Routing process 44 receives replicated routing messages from primary routing node 22, updates routing database 42, and outputs routing messages as if it were handling all routing functions for router 20. The replicated sockets of secondary routing node 40 are logical constructs having data structures and state data maintained by an OS of secondary routing node 40 and act as an interface between routing process 44 and a protocol stack of secondary routing node 40. In this example, secondary routing node 40 further includes forwarding process 48, which routing process 44 may program to operate as a forwarding engine. In other examples, primary routing node 22 and secondary routing node 40 may share a common forwarding process (forwarding engine) or multiple common forwarding processes/forwarding engines, which may be included within respective IFCs 58.

Secondary routing node 40 also includes telemetry unit 46. According to the techniques of this disclosure, when telemetry unit 28 receives a subscription to statistics of a metrics streaming session, telemetry unit 28 forwards the subscription to telemetry unit 46 of secondary routing node 40. Like telemetry unit 28, telemetry unit 46 also instantiates sensors in routing process 44, forwarding process 48, IFCs 58, and/or other line cards, according to the statistics requested in the subscription. Telemetry unit 28 may further replicate telemetry session data, including data representative of statistics received from its instantiated sensors, to telemetry unit 46, such that telemetry unit 46 can resume the telemetry session from an appropriate point corresponding to switchover or failover from primary routing node 22 to secondary routing node 40.

Figure 3:
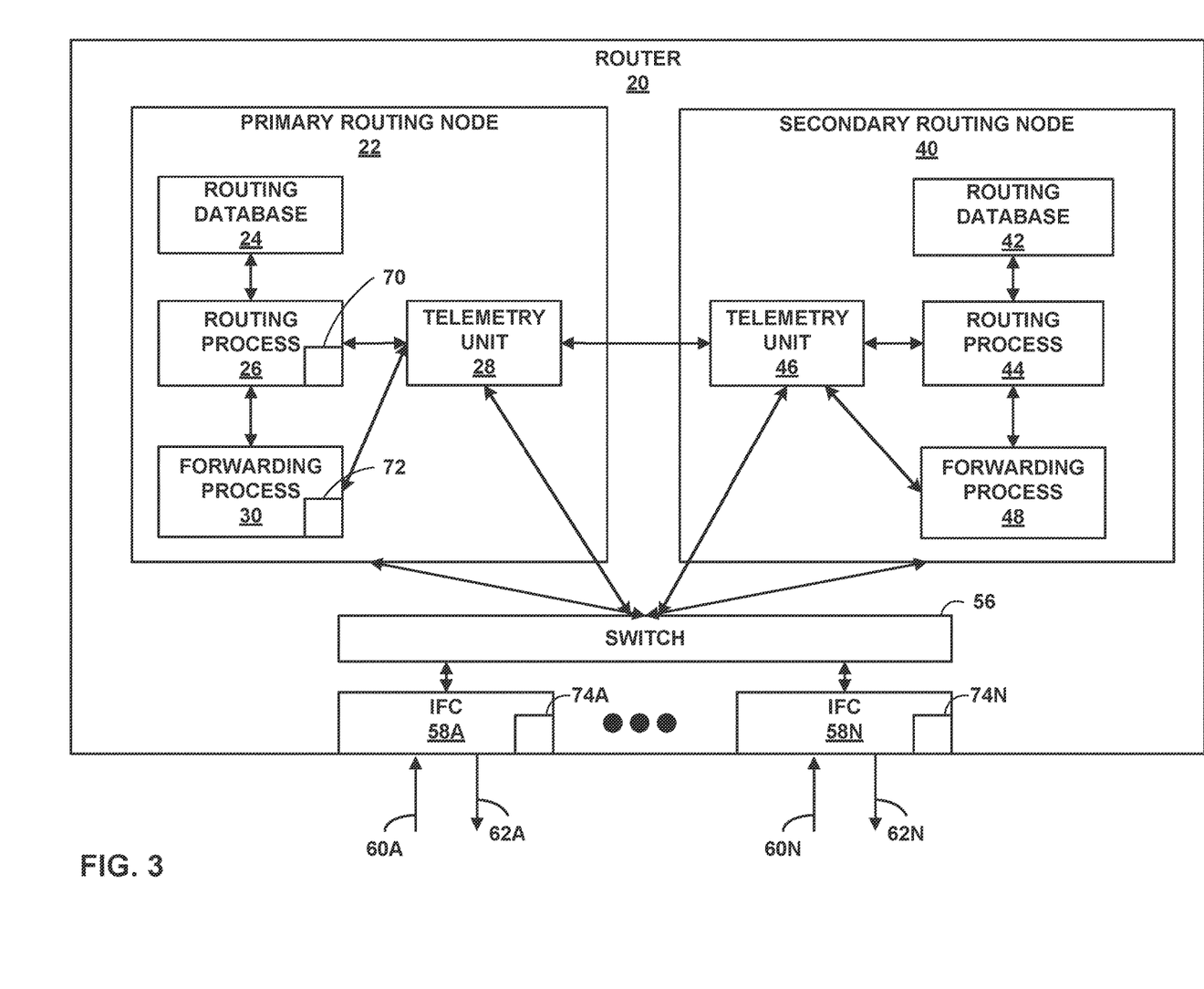
FIG. 3 is a block diagram illustrating sensors instantiated within various network elements of router.

FIG. 3 is a block diagram illustrating sensors instantiated within various network elements of router 20. A network element may include one or more sensors. In this example, telemetry unit 28 instantiates sensor 70 in routing process 26, sensor 72 in forwarding process 30, and sensors 74A-74N (referred to collectively as "sensors 74") in IFCs 58A-58N, respectively. Sensors 70, 72, 74 may be configured to collect statistics data from one or more sensors thereof and cause a corresponding producer to send the statistics data to telemetry unit 28. For example, sensor 70 may send statistics related to routes learned or discovered, sensor 72 may send statistics related to packets or data (e.g., bytes) sent or received (e.g., in total or via various interfaces, such as respective IFCs 58), and sensors 74 may send statistics related to packets or data/bytes sent or received (e.g., packets encapsulated in tunnels, lost packets, numbers of packets received, sizes of packets received, or the like). Telemetry unit 28 may instantiate sensors 70, 72, 74 in response to a subscription to metrics data of a telemetry session from collector device 10.

Figure 4:
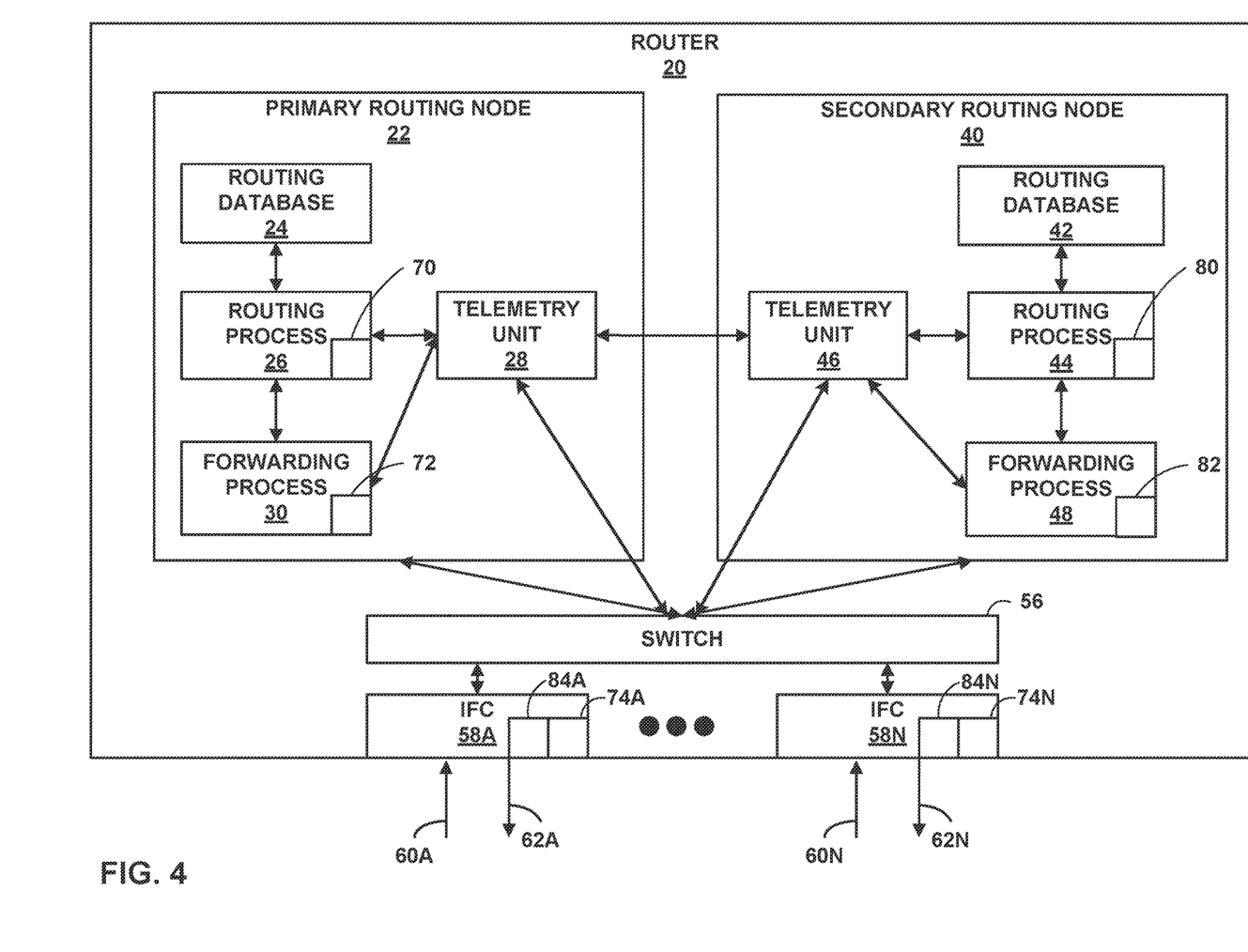
FIG. 4 is a block diagram illustrating further sensors instantiated within various network elements of a router.

FIG. 4 is a block diagram illustrating further sensors instantiated within various network elements of router 20. In this example, after (or concurrently with) telemetry unit 28 instantiates sensor 70 in routing process 26, sensor 72 in forwarding process 30, and sensors 74A-74N in IFCs 58A-58N, respectively, telemetry unit 28 also sends the subscription to telemetry unit 46 of secondary routing node 40. Thus, according to the techniques of this disclosure, telemetry unit 46 instantiates sensor 80 in routing process 44, sensor 82 in forwarding process 48, and sensors 84A-84N (referred to collectively as "sensors 84") in IFCs 58A-58N, respectively. Like sensors 70, 72, and 74, sensors 80, 82, 84 may be configured to send statistics to telemetry unit 46, when secondary routing node 40 is acting as an active routing node (i.e., following switchover or failover).

Furthermore, when primary routing node 22 is acting as the active routing node and secondary routing node 40 is acting as the standby routing node, telemetry unit 28 may replicate data of the telemetry session to telemetry unit 46, such that telemetry unit 28 sends data representative of the statistics data received from sensors 70, 72, 74 to telemetry unit 46. Thus, in response to a switchover from primary routing node 22 to secondary routing node 40 (thereby causing secondary routing node 40 to act as the active routing node), telemetry unit 46 may send any unsent data of the telemetry session (including data representative of statistics data from sensors 70, 72, 74) to collector device 10, and begin receiving data from sensors 80, 82, 84 to be sent to collector device 10. Accordingly, telemetry unit 46 may resume the telemetry session following the switchover without interruption to the telemetry session.

Figure 5:
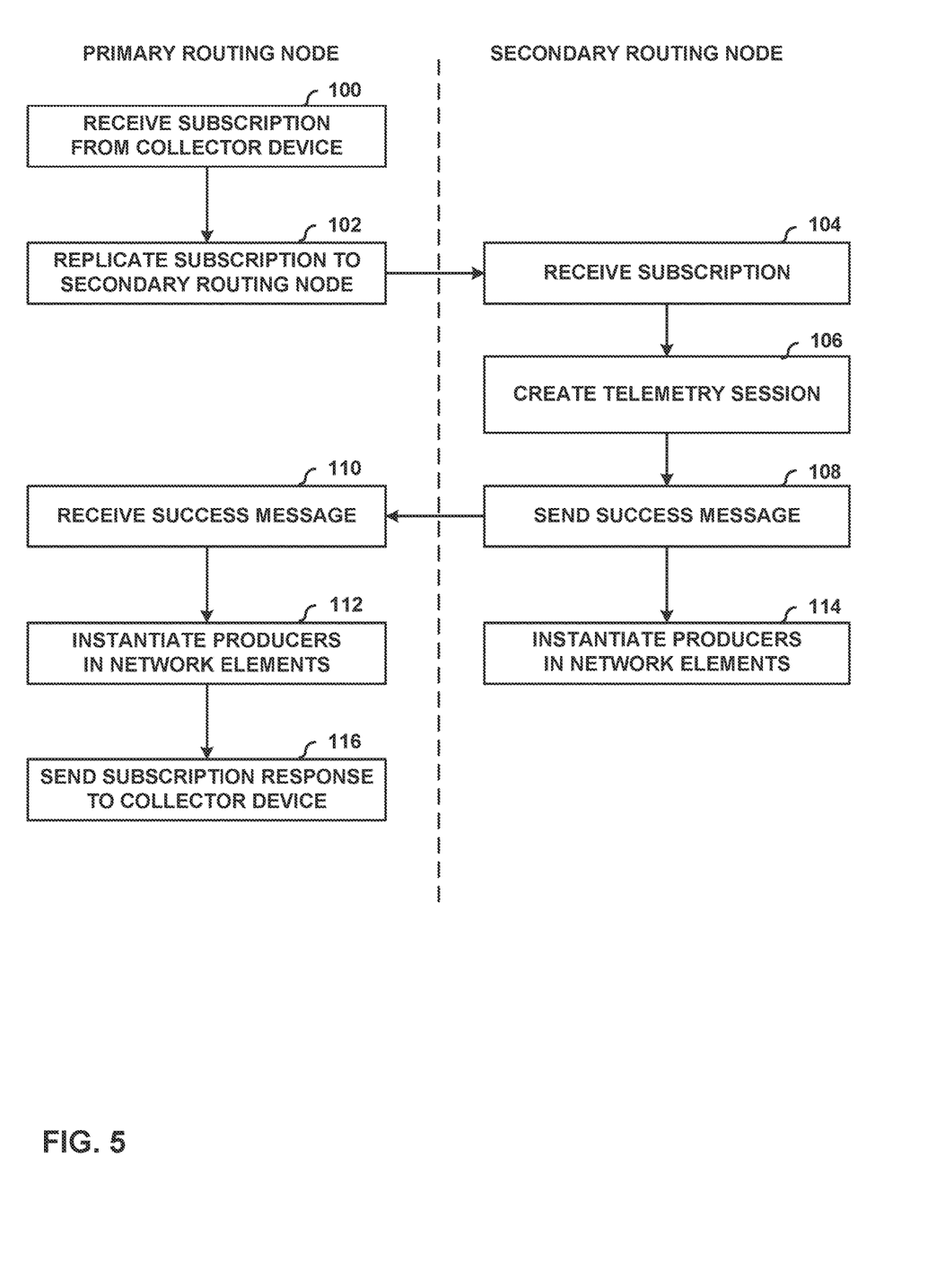
FIG. 5 is a flowchart illustrating an example method according to the techniques of this disclosure.

FIG. 5 is a flowchart illustrating an example method according to the techniques of this disclosure. The method of FIG. 5 is explained with respect to primary routing node 22 and secondary routing node 40 of router 20 of FIG. 2 for purposes of example and explanation. As discussed above, primary routing node 22 may initially be configured as a master routing node, and secondary routing node 40 may initially be configured as a backup (or standby) routing node for primary routing node 22 in the event of a switchover (e.g., failover) from primary routing node 22 to secondary routing node 40.

Initially in this example, primary routing node 22 may receive a subscription to statistics of a metrics streaming session (i.e., a telemetry session) from collector device 10 (FIG. 1) (100). The subscription may indicate one or more network elements of router 20 from which to receive statistics, as well as types of statistics to be received. For example, the subscription may indicate whether to send statistics related to a routing engine, a forwarding engine, and/or a line card, as well as types of statistics to be sent for each of these network elements. Primary routing device 22 may initiate the telemetry session and replicate the subscription to secondary routing node 40 (102).

Secondary routing node 40 may receive the subscription (104) and, in response, create a telemetry session (106). The telemetry session may be, for example, a gRPC streaming session, a NETCONF streaming session, a Representational State Transfer (REST) session, or an OpenFlow session, or other such universal RPC framework. After creating the telemetry session, secondary routing node 40 may send a success message to primary routing node 22 (108).

In response to receiving the success message (110), primary routing node 22 may instantiate sensors in the network elements (112). For example, as shown in FIGS. 3 and 4, primary routing node 22 may instantiate any or all of sensors 70, 72, 74, or other sensors in other network elements. Likewise, secondary routing node 40 may also instantiate one or more sensors as shown in FIG. 4, e.g., any or all of sensors 80, 82, 84, or other sensors in other network elements (114). Primary routing node 22 may then send a subscription response to collector device 10 (116) indicating that the telemetry session has been established.

Figure 6:
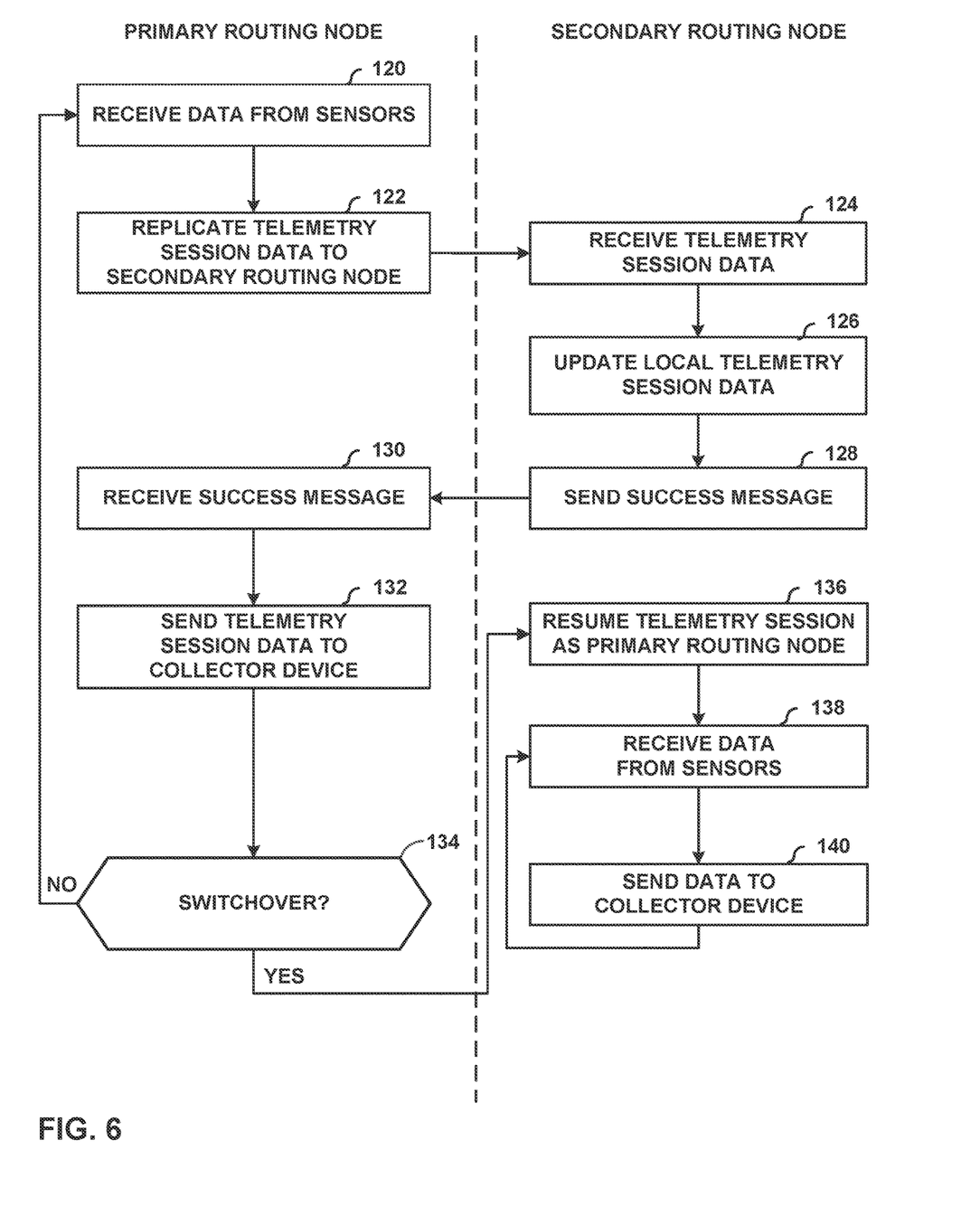
FIG. 6 is a flowchart illustrating an example method for sending data of a telemetry session according to the techniques of this disclosure.

FIG. 6 is a flowchart illustrating an example method for sending data of a telemetry session according to the techniques of this disclosure. The method of FIG. 6 may be performed by primary routing node 22 and secondary routing node 40 of router 20 of FIG. 2 following performance of the method of FIG. 5.

After establishing a telemetry session according to the method of FIG. 5, primary routing node 22 may receive statistics data from sensors 70, 72, and/or 74 (FIGS. 3 and 4) (120). In response, primary routing node 22 may form telemetry session data including data representative of the statistics data, then replicate the telemetry session data (including the data representative of the statistics data) to secondary routing node 40 (122). Secondary routing node 40 may receive the telemetry session data (124), update any local data (e.g., cached telemetry session data) (126), and send a success message to primary routing node 22 (128). After receiving the success message (130), primary routing node 22 may send the telemetry session data to collector device 10 (132).

At some point, a switchover from primary routing node 22 to secondary routing node 40 may occur (134). If the switchover has not occurred ("NO" branch of 134), primary routing node 22 may continue to act as the primary routing node, e.g., for socket data and/or the telemetry session. However, if the switchover has occurred ("YES" branch of 134), secondary routing node 40 may begin acting as a primary routing node (i.e., as a master or active routing node). Thus, secondary routing node 40 may resume the telemetry session as the primary routing node (136). For example, secondary routing node 40 may send any unsent telemetry session data including data representative of the statistics data from sensors 70, 72, 74, to collector device 10. After secondary routing node 40 begins acting as the master routing node and telemetry unit 46 resumes the telemetry session, secondary routing node 40 may receive statistics data from sensors 80, 82, and/or 84 (FIG. 4) (138), construct telemetry session data including data representative of the statistics data, and send the telemetry session data to collector device 10 (140). In this manner, the telemetry session can continue uninterrupted. Thus, router 20 may provide high availability for a telemetry session.

In this manner, the method of FIGS. 5 and 6 represents an example of a method including receiving, by a primary node of a routing device, a message from a collector device requesting to initiate a telemetry session to subscribe to statistics of a metrics streaming session; initiating, by the primary node, the telemetry session for sending the statistics to the collector device; replicating, by the primary node, data of the telemetry session to a secondary node of the routing device, the secondary node being configured as a backup node to the primary node in the event of a switchover from the primary node to the secondary node; and sending, by the primary node, the data of the telemetry session to the collector device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   receiving, by a primary node of a routing device, a message from a collector device requesting to initiate a telemetry session to subscribe to statistics of a metrics streaming session;
   initiating, by the primary node, the telemetry session for sending the statistics to the collector device, wherein initiating the telemetry session comprises initializing one or more sensors for one or more network elements of the routing device to produce statistics data for the telemetry session, the one or more network elements including one or more of a line card, a packet forwarding engine, or a routing engine;
   replicating, by the primary node, data of the telemetry session to a secondary node of the routing device, the secondary node being configured as a backup node to the primary node in the event of a switchover from the primary node to the secondary node; and
   sending, by the primary node, the data of the telemetry session to the collector device.

2. The method of claim 1, wherein initiating the telemetry session comprises initiating one of a gRPC streaming session, a NETCONF streaming session, a Representational State Transfer (REST) session, or an OpenFlow session.

3. The method of claim 1, wherein replicating the data of the telemetry session comprises:
   receiving statistics data from one or more sensors related to the metrics streaming session; and
   sending telemetry session data representative of the received statistics data to the secondary node.

4. The method of claim 1, wherein the telemetry session comprises a transmission control protocol (TCP) session and a plurality of HTTP/2 sessions over the TCP session, and wherein replicating the data of the telemetry session comprises replicating data of the TCP session and each of the HTTP/2 sessions to the secondary node.

5. The method of claim 1, further comprising:
   performing, by the secondary node, the switchover to cause the secondary node to act as the primary node for the routing device; and
   after the switchover:
      receiving, by the secondary node, statistics data from one or more sensors related to the metrics streaming session; and
      sending, by the secondary node, telemetry data representative of the statistics data to the collector device as part of the telemetry session.

6. A routing device comprising:
   one or more network elements including one or more of a line card, a packet forwarding engine, or a routing engine;
   a primary node implemented in circuitry; and
   a secondary node implemented in circuitry, the secondary node being configured as a backup node to the primary node in the event of a switchover from the primary node to the secondary node;
   wherein the primary node is configured to:
      receive a message from a collector device requesting to initiate a telemetry session to subscribe to statistics of a metrics streaming session;
      initiate the telemetry session for sending the statistics to the collector device, wherein to initiate the telemetry session, the primary node is configured to initialize one or more sensors in at least one of the network elements to produce statistics data for the telemetry session;
      replicate data of the telemetry session to the secondary node; and
      send the data of the telemetry session to the collector device.

7. The routing device of claim 6, wherein the telemetry session comprises one of a gRPC streaming session, a NETCONF streaming session, a Representational State Transfer (REST) session, or an OpenFlow session.

8. The routing device of claim 6, wherein to replicate the data of the telemetry session, the primary node is configured to:
- receive statistics data from one or more sensors related to the metrics streaming session; and
- send telemetry session data representative of the received statistics data to the secondary node.

9. The routing device of claim 6, wherein the telemetry session comprises a transmission control protocol (TCP) session and a plurality of HTTP/2 sessions, and wherein to replicate the data of the telemetry session, the primary node is configured to replicate data of the TCP session and each of the HTTP/2 sessions to the secondary node.

10. The routing device of claim 6, wherein the secondary node is configured to:
- perform the switchover to cause the secondary node to act as the primary node for the routing device; and
- after the switchover:
  - receive statistics data from one or more sensors related to the metrics streaming session; and
  - send telemetry data representative of the statistics data to the collector device as part of the telemetry session.

11. A computer-readable storage medium having stored thereon instructions that, when executed, cause a processor of a primary node of a routing device to:
- receive a message from a collector device requesting to initiate a telemetry session to subscribe to statistics of a metrics streaming session;
- initiate the telemetry session for sending the statistics to the collector device, wherein the instructions that cause the processor to initiate the telemetry session comprise instructions that cause the processor to initialize one or more sensors for one or more network elements of the routing device to produce statistics data for the telemetry session, the one or more network elements including one or more of a line card, a packet forwarding engine, or a routing engine;
- replicate data of the telemetry session to a secondary node of the routing device, the secondary node being configured as a backup node to the primary node in the event of a switchover from the primary node to the secondary node; and
- send the data of the telemetry session to the collector device.

12. The computer-readable storage medium of claim 11, wherein the instructions that cause the processor to initiate the telemetry session comprise instructions that cause the processor to initiate one of a gRPC streaming session, a NETCONF streaming session, a Representational State Transfer (REST) session, or an OpenFlow session.

13. The computer-readable storage medium of claim 11, wherein the instructions that cause the processor to replicate the data of the telemetry session comprise instructions that cause the processor to:
- receive statistics data from one or more sensors related to the metrics streaming session; and
- send telemetry session data representative of the received statistics data to the secondary node.

14. The computer-readable storage medium of claim 11, further comprising instructions that cause a processor of the secondary node to:
- perform the switchover to cause the secondary node to act as the primary node for the routing device; and
- after the switchover:
  - receive statistics data from one or more sensors related to the metrics streaming session; and
  - send telemetry session data representative of the statistics data to the collector device as part of the telemetry session.

* * * * *